(12) United States Patent
Chen et al.

(10) Patent No.: US 8,818,922 B2
(45) Date of Patent: Aug. 26, 2014

(54) METHOD AND APPARATUS FOR PREDICTING APPLICATION PERFORMANCE ACROSS MACHINES WITH DIFFERENT HARDWARE CONFIGURATIONS

(75) Inventors: Haifeng Chen, Old Bridge, NJ (US);
Hui Kang, Stony Brook, NY (US);
Guofei Jiang, Princeton, NJ (US); Kenji Yoshihira, Princeton Junction, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 198 days.

(21) Appl. No.: 13/171,812

(22) Filed: Jun. 29, 2011

(65) Prior Publication Data

US 2011/0320391 A1 Dec. 29, 2011

Related U.S. Application Data

(60) Provisional application No. 61/359,426, filed on Jun. 29, 2010.

(51) Int. Cl.
*G06F 15/18* (2006.01)
*G06F 11/34* (2006.01)

(52) U.S. Cl.
CPC ...... *G06F 11/3452* (2013.01); *G06F 2201/815* (2013.01); *G06F 2201/865* (2013.01); *G06F 11/3409* (2013.01); *G06F 11/3457* (2013.01)
USPC .................. 706/14; 711/118; 706/15

(58) Field of Classification Search
None
See application file for complete search history.

(56) References Cited

U.S. PATENT DOCUMENTS

| 7,346,736 B1 * | 3/2008 | Gluhovsky et al. ............ 711/118 |
| 2010/0131440 A1 * | 5/2010 | Chen et al. ........................ 706/15 |
| 2011/0004426 A1 * | 1/2011 | Wright et al. .................... 702/61 |
| 2011/0044524 A1 * | 2/2011 | Wang et al. .................... 382/131 |

* cited by examiner

*Primary Examiner* — Kakali Chaki
*Assistant Examiner* — Luis Sitiriche
(74) *Attorney, Agent, or Firm* — Joseph Kolodka

(57) ABSTRACT

A method and system for predicting performance of an application on a machine of a predetermined hardware configuration simulates the performance of the application under a plurality of different simulated hardware configurations; builds a predictive model of the performance of the application based on the results of the simulations; obtains the performance of the application on a plurality of actual machines, each of the machines having a different hardware configuration; and Bayesian reinterprets the predictive model built from the results of the simulations using the performance of the application on the plurality of actual machines, to obtain a final predictive model of the performance of the application having an accuracy greater than the predictive model built from the results of the simulations.

16 Claims, 6 Drawing Sheets input variables: $x = [x_1, x_2, \cdots, x_r]$ transformation :

$$z = [z_1, z_2, \cdots, z_s], \text{ where}$$
$$z_i = \begin{cases} x_i & i = 1, \cdots, r \\ \log(x_{i-r}) & i = r+1, \cdots, s \end{cases}$$

basis functions :

$$\Phi(z) = [\phi_1(z), \phi_2(z), \cdots, \phi_p(z)]$$
$$= [1, z_1, z_2, \cdots, z_s, z_1 z_2, z_1 z_3,$$
$$\cdots, z_1^2, z_2^2, \cdots, z_s^2]$$

FIG. 3

METHOD AND APPARATUS FOR PREDICTING APPLICATION PERFORMANCE ACROSS MACHINES WITH DIFFERENT HARDWARE CONFIGURATIONS

RELATED APPLICATIONS

This application claims the benefit of U.S. Provisional Application No. 61/359,426, filed Jun. 29, 2010, the entire disclosure of which is incorporated herein by reference.

FIELD

This application relates to system management and operation of large-scale systems and networks having heterogeneous components. More particularly, this application relates to a method and apparatus for predicting application performance across machines having hardware configurations with different hardware specifications or settings.

BACKGROUND

Recent years have witnessed an explosive growth of servers in enterprise data centers and clouds. Those machines usually come from different venders with a wide range of hardware configurations with different hardware specifications such as processor speed, processor cache size, and so on. Such a heterogeneity introduces extra challenges in system management. For example, we need to differentiate the computation capabilities of various hardware configurations in order to evenly distribute workloads across machines. In the capacity planning task, that knowledge is also required to determine the right number and types of servers to be purchased for the increasing workloads. The recent resurgence of virtualization technology opens up huge demand for application performance mapping across heterogeneous hardware, because virtualization allows applications to migrate between different machines. If the source and target machines after migration have different hardware configurations with different hardware specifications or settings, many system management tools that build a performance model on the initial hardware setting may require recalibration.

The above challenges of server heterogeneity call for a technique that can accurately map application performance across machines with different hardware specifications and settings. A number of techniques have been proposed for accurately mapping application performance across machines with different hardware specifications and settings, but these techniques are limited in one way or another. These techniques can be divided into two classes. The first class evaluates application performance on a number of different servers in advance, and builds a model to summarize the application performance across those machines. In practice, however, it is difficult to collect enough data from machines with different hardware configurations. With the lack of measurement data, the real (actual) evaluation based techniques only include a limited number of hardware parameters, and rely on simple models such as the linear regression to learn their relationships. Such a simplification significantly jeopardizes the prediction accuracy of application performance.

In order to address the data insufficiency issue, the second class of techniques relies on software simulation to collect data for performance modeling. There are many simulation tools that can construct a complete microprocessor pipeline in software to approximate the application performance on any specified hardware device. By using those tools, sufficient data can be collected from a wide range of hardware configurations to learn a complete model for predicting application performance. By its very nature, however, the software based simulation necessarily yields uncertain and inaccurate data due to the specification inaccuracy, implementation imprecision, and other factors in those tools. As a consequence, the quality of the learned model can be affected by those errors.

Accordingly, a new method and apparatus is needed for predicting application performance across machines with different hardware configurations.

SUMMARY

A method is disclosed for predicting performance of an application on a machine of a predetermined hardware configuration. The method comprises: simulating, in a computer process, the performance of the application under a plurality of different simulated hardware configurations; building, in a computer process, a predictive model of the performance of the application based on the results of the simulations; obtaining the performance of the application on a plurality of actual machines, each of the machines having a different hardware configuration; and in a computer process, Bayesian reinterpreting the predictive model built from the results of the simulations using the performance of the application on the plurality of actual machines, to obtain a final predictive model of the performance of the application having an accuracy greater than the predictive model built from the results of the simulations.

In some embodiments of the method the building of the predictive model comprises modeling nonlinear dependencies between the simulated performance of the application and the simulated hardware configurations with a generalized linear regression model with L1 penalty.

In some embodiments of the method the modeling of nonlinear dependencies comprises defining a set of basis functions to transform original variables so that their nonlinear relationships can be included in the predictive model.

In some embodiments of the method the modeling of nonlinear dependencies comprises applying the L1 norm penalty on coefficients of the generalized linear regression model to achieve sparseness of the predictive model's representation.

In some embodiments of the method the Bayesian reinterpreting of the predictive model comprises searching for an optimal solution for the linear regression model with L1 penalty.

In some embodiments of the method the Bayesian reinterpreting of the predictive model built from the results of the simulations comprises relearning parameters of the linear regression model using the performance of the application on the plurality of actual machines.

In some embodiments of the method the Bayesian reinterpreting of the predictive model built from the results of the simulations comprises defining a prior distribution which embeds information learned from the simulations to restrict values of the coefficients of the linear regression model.

In some embodiments of the method the Bayesian reinterpreting of the predictive model built from the results of the simulations comprises maximizing posterior probability distribution of model parameters so that the final predictive model comprises contributions from the simulated and actual hardware configurations.

An apparatus is disclosed for predicting performance of an application on a machine of a predetermined hardware configuration. The apparatus comprises a processor executing instructions for simulating the performance of the application under a plurality of different simulated hardware configurations; building a predictive model of the performance of the application based on the results of the simulations; and Bayesian reinterpreting the predictive model built from the results of the simulations using the performance of the application on a plurality of actual machines each having a different hardware configuration, to obtain a final predictive model of the performance of the application having an accuracy greater than the predictive model built from the results of the simulations.

In some embodiments of the apparatus the instructions for building of the predictive model comprises instructions for modeling nonlinear dependencies between the simulated performance of the application and the simulated hardware configurations with a generalized linear regression model with L1 penalty.

In some embodiments of the apparatus the instructions for modeling of nonlinear dependencies comprises instructions for defining a set of basis functions to transform original variables so that their nonlinear relationships can be included in the predictive model.

In some embodiments of the apparatus the instructions for modeling of nonlinear dependencies comprises instructions for applying the L1 norm penalty on coefficients of the linear regression model to achieve sparseness of the predictive model's representation.

In some embodiments of the apparatus the instructions for Bayesian reinterpreting of the predictive model comprises instructions for searching for an optimal solution for the linear regression model with L1 penalty.

In some embodiments of the apparatus the instructions for Bayesian reinterpreting of the predictive model built from the results of the simulations comprises instructions for relearning parameters of the linear regression model using the performance of the application on the plurality of actual machines.

In some embodiments of the apparatus the instructions for Bayesian reinterpreting of the predictive model built from the results of the simulations comprises instructions for defining a prior distribution which embeds information learned from the simulations to restrict values of the coefficients of the linear regression model.

In some embodiments of the apparatus the instructions for Bayesian reinterpreting of the predictive model built from the results of the simulations comprises instructions for maximizing posterior probability distribution of model parameters so that the final predictive model comprises contributions from the simulated and actual hardware configurations.

BRIEF DESCRIPTION OF THE DRAWINGS

FIG. 3 illustrates the construction of a plurality of basis functions that are used to transform variables into a set of new representations in accordance with the process of block 202 of FIG. 2

DETAILED DESCRIPTION

Figure 1:
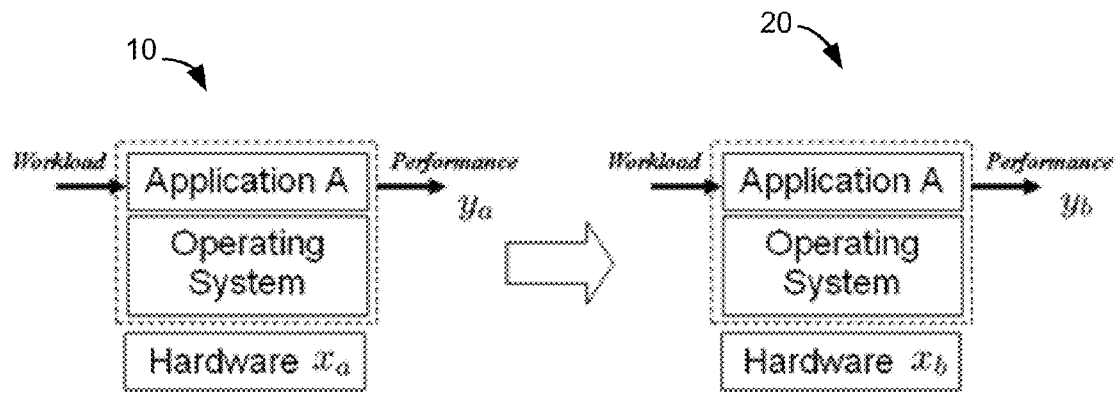
FIG. 1 illustrates an exemplary embodiment of application performance mapping across heterogeneous machines.

FIG. 1 illustrates an exemplary embodiment of application performance mapping across heterogeneous machines (servers having hardware configurations with different hardware specifications or settings) used in an enterprise data center or cloud. Application A is first hosted by an operating system running on a first server (machine) 10 with a first hardware configuration $x_a$ and application A is then hosted by an operating system running on a second server (machine) 20 with a second (different) hardware configuration $x_b$. Given input workloads, the performance of application A on the first machine is represented as $y_a$. When application A moves to second machine 20 with the different hardware configuration $x_b$, its performance changes to $y_b$ under the same workload due to the different computing capacity of the second machine. The method of the present disclosure learns a performance model $y=f(x)$ for predicting application performance y on a machine with any hardware configuration based on hardware configuration x of another machine. The inputs of the model include, without limitation, the number of data TLB entries, the number of instruction TLB entries, L1 cache size, L1 cache line size, L1 cache associativity (ways), L2 cache size, L2 cache latency, memory latency, load queue size, and issue queue size. The output of the model is application performance which is represented in one embodiment, as the average CPU cycles per instruction (CPI).

The predictor x in the performance model represents various hardware specifications including, without limitation, data/instruction translation lookaside buffer (TLB) sizes, data/instruction level 1 (L1) cache sizes, level 2 (L2) cache sizes, L1 cache latency, L2 cache latency, and other various hardware specifications. The hardware specifications can be obtained from spec sheets of the corresponding machine. The response variable y measures the quality of serving the incoming workloads. The definition of that performance metric varies with the characteristics of the application. While some computation intensive applications use the system throughput to measure the quality of service, some user interactive applications rely on the request response time to describe the performance. Instead of focusing on those application specific metrics, the method of the present disclosure uses machine CPU utilization for system performance, because it has been shown that the CPU utilization is highly correlated with high level performance metrics such as the throughput or request response time.

Machine CPU utilization also depends on the intensity of the incoming workloads. Because the present method uses a performance variable whose value is only determined by the specifications of underlying hardware, the method of the present disclosure removes the portion of workload contributions, by decomposing the machine CPU utilization as:

$$CPU \text{ utilization} \sim \frac{(number\ of\ instructions) \times (CPU\ cycles\ per\ instruction)}{(CPU\ speed)}. \quad (1)$$

In other words, machine CPU utilization is determined by the number of instructions issued by the application, the CPU cycles per instruction (CPI), and the CPU speed. Note that the number of issued instructions is proportional to the intensity of workloads, and CPU speed is a parameter that can be obtained from the hardware specifications. Therefore, the method of the present disclosure focuses on CPU cycles per instruction (CPI) as the performance variable y. This metric reflects the hardware contribution to application performance, and its value can be measured during the system operation by well known specific tools including, but not limited to the OProfile system-wide profiler. Given the CPI measurements on a set of hardware instances, the method of the present invention builds a statistical performance model $y=f(x)$ to predict the CPI value (the output of the model) when the application is running on any new hardware platforms.

The prediction model of the present disclosure can benefit many management tasks in a heterogeneous environment. For example, the prediction model of the present disclosure can be used to determine the right number and types of new machines that need to be purchased during system capacity planning, even when those machines are not available yet. The recent resurgence of virtualization technology also introduced considerable interests in the performance mapping across heterogeneous hardware, because virtualization applications are capable of migrating between different machines. If the original and destination machines after migration are different, some management tools may require recalibration after migration, especially for those tools that rely on the relationship between the application performance and other system measurements such as the workload intensity. Model recalibration needs to be accomplished in real time so that it can take effect immediately after the migration.

One challenge of learning the model is lack of measurement data, because there is usually not enough hardware instances available for model training Given limited data, some simplifications are commonly used in the model construction, which either reduce the number of hardware parameters or use a simple function $\eta(-)$ to reflect their relationships. For example, one previous method builds a loglinear model based only on L1 and L2 caches sizes for performance prediction. Other prior art methods use software simulation to address the data insufficiency issue. While the simulation can generate enough data for constructing the performance model, there are always errors associated with simulation due to the implementation imprecision and specification inaccuracies in those tools. Such errors will affect the prediction model learned from simulation results.

Figure 2:
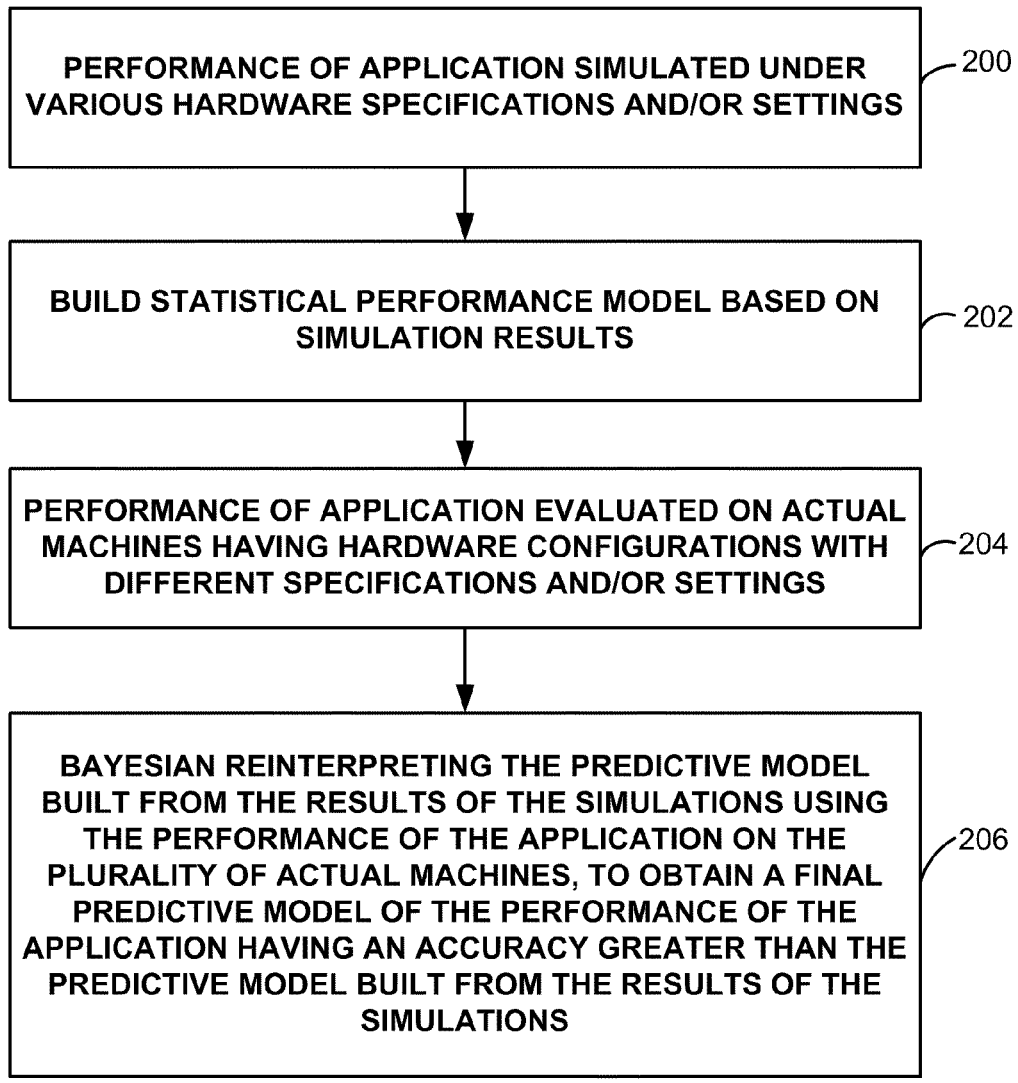
FIG. 2 is flowchart of a method for estimating application performance across heterogeneous machines according to the principles of the present disclosure.

FIG. 2 is flowchart of the method for estimating application performance across heterogeneous machines according to the principles of the present disclosure. In block 200, the behavior of the application of interest is simulated under various hardware settings. In block 202, a statistical model is built to summarize the simulation results. In block 204, the application is evaluated on a number of actual hardware instances to account for errors in simulation. In block 206, the actual hardware data is applied to the model learned from simulation using Bayesian learning theory to enhance its accuracy. The use of Bayesian learning theory allows the method of the present disclosure to take full advantage of both actual evaluation and simulation based methods, thereby avoiding their shortcomings. As a consequence, the method of the present disclosure obtains a better performance prediction model than existing techniques.

In the simulation process of block 200, a simulation tool such as, but not limited to, a PTLsim, is used to collect data [x, y] where x represents hardware specifications of the machine of interest and y is the application performance, i.e., the average CPU cycles per instruction (CPI) on that machine.

Given those data, a generalized linear regression with $L_1$ penalty is used in block 202 to model the non-linear dependencies between the application performance (response y) and underlying hardware parameters (input variables x). A plurality of non-linear templates based on the domain knowledge, are generated to transform original variables, and a set of polynomial basis functions are applied to the new variables. Because the exact form of nonlinear relationship between variables is not known, all possible basis functions are included in the model, and many of them may not have any relationship with the performance. In order to remove irrelevant components, the method applies the $L_1$ penalty on regression coefficients, and an algorithm (to be described further on) is used to identify the optimal solution for that constrained regression problem. The sparse statistical model that results from this process can effectively predict the performance of the application based on simulation results.

Due to the errors in software simulation, the process of block 204 comprises the running of the application on a limited number of actual hardware instances, and the use of Bayesian learning in the process of block 206 to enhance the model learned from simulation. The evaluation data from the actual hardware instances is used to relearn the parameters of the regression model from the simulation. Because the limited number of actual performance measurements will introduce large variances in the model fitting, the knowledge learned from simulation is used to restrict the values of regression coefficients. Such a prior constraint is represented as a Gaussian distribution with the mean as the values of corresponding coefficients learned from simulation. By maximizing the posterior probability of model parameters, a solution (the performance model) is found that takes advantages of both simulation and actual evaluation results in the performance prediction of the model.

FIG. 3 illustrates the construction of a plurality of basis functions that are used to transform variables into a set of new representations in accordance with the process of block 202 of FIG. 2. In order to cover the non-linear dependencies between the application performance (response y) and hardware specifications (input variables x), a set of new variables is defined in the model $f(')$. In block 300, the original inputs x are expanded into another set $z=[x, \log(x)]$, which includes the logarithmic transformation of x as well as the original variables. Such a transformation is based on the observation that the logarithmic function frequently appears between the application performance and many hardware parameters such as the TLB size, the cache size, and so on. However, because it is hard to tell the exact subset of original variables that have logarithmic relationship with the performance y, the new set z contains the logarithmic transformation of all inputs x.

Besides the logarithmic relationship, there are also other nonlinearities in the performance model. The majority of those nonlinearities appear to lie in the polynomial representation of variables. In order to include those factors, block 302 applies a polynomial kernel with the order 2 on the variables z to obtain a pool of basis functions $\{\emptyset_1(z), \emptyset_2(z), \ldots, \emptyset_p(z)\}$. As can be seen, those basis functions contain the terms of variables z taken the polynomial of degree at most 2.

Given the original inputs x with r variables, the vector z doubles the number of variables, i.e., $s=2r$, and the number of basis functions in the pool becomes $p=1+s+s(s+1)/2$. Many basis functions may be obtained in the regression even when the number of original variables is small. For example, if the input x contains 10 variables, the number of basis functions already reaches 231. Such a large number of basis functions is due to the lack of knowledge about the exact form of nonlinear relationships in the underlying model. Therefore, all possible forms of nonlinearities are included in the representation $$y = \beta_1 \phi_1(z) + \beta_2 \phi_2(z) + \ldots + \beta_p \phi_p(z) \quad (2)$$

In reality, most of the basis functions may not have any statistical relationship with the response y. The irrelevant components must be removed for achieving a sparse representation of the regression model.

The following discussion describes the construction of the statistical application performance model built in block 202 of FIG. 2. In order to prune out irrelevant components, an algorithm that applies $L_1$-norm regulation on regression coefficients is used to discover a sparse prediction model. Based on simulation outputs $[x^{(i)}, y^{(i)}]$, $i = 1, \ldots, n$, the process of block 202 generates data $D = [\Phi, y]$, where $\Phi = [\Phi^{(1)}, \Phi^{(2)}, \ldots, \Phi^{(n)}]^T$, $\Phi^i = [\phi_1^{(i)}, \phi_2^{(i)}, \ldots \phi_p^{(i)}]$, and $y = [y^{(1)}, \ldots, y^{(n)}]^T$. To simplify this expression, $\phi_k$ is used to denote the basis function $\phi_k(z)$. Given those data, the process of block 202 estimates the coefficients $\beta = [\beta_1, \beta_2, \ldots, \beta_p]$ for the generalized regression equation (2).

In reality, many elements in β should be zero because many basis functions do not have any relationship with y. In order to eliminate the irrelevant components, a regularization term g(β) is applied to the coefficients in addition to minimizing the squared error for the regression equation (2)

$$\beta = \underset{\beta}{\operatorname{argmin}} \{ \| y - \Phi\beta \|_2^2 + \lambda g(\beta) \} \quad (3)$$

where λ≥0 is a parameter to balance the tradeoff between the error and penalization parts in equation (3). Since the goal of regulization is to minimize the number of non-zero elements in β, a natural choice of g(β) would be the $L_0$-norm of β, $\|\beta\|_0$. However, since choosing $\|\beta\|_0$ involves combinatorial search for the solution that is hard to solve, g(β) is often chosen to be some relaxed forms of $L_0$-norm. Among many choices of relaxations, $L_1$-norm is the most effective way. It is well known that with $L_1$-norm constraint, $g(\beta) = \|\beta\|_1$, the optimal solution β is constrained to be on the axes in the coefficient space and thus is sparse, whereas other alternatives such as $L_2$-norm do not have that property. Therefore, $L_1$-norm is used as the penalty function g(β) to enforce the sparseness of solution β.

It is not straightforward to find the optimal solution for equation (3) because $\|\beta\|_1$ does not differentiate at $\beta_i = 0, \ldots, p$. Although prior art processes exist for solving the optimization, existing methods are either slow to converge or complicated to implement.

Therefore, a process based on the Bayesian interpretation of the optimization objective equation (3) is used to find the solution. The probability model for equation (3) denotes that the application performance y is corrupted by Gaussian noise $$p(y|\beta) \propto \left(\frac{1}{\sqrt{2\pi\sigma^2}}\right)^n \exp\left\{\frac{\|y - \Phi\beta\|^2}{2\sigma^2}\right\}, \quad (4)$$

where $\sigma^2$ describes the noise level, and each coefficient $\beta^i$ is governed by a Laplacian prior $$p(\beta_i | \gamma) = \frac{\sqrt{\gamma}}{2} \exp(\sqrt{\gamma} |\beta_i|) \quad (5)$$

where γ is a predefined constant in the prior. The optimization of (3) maximizes the posterior distribution $$p(\beta, \sigma^2 | D, \gamma) \propto p(y|\beta, \sigma^2) p(\beta|\gamma) \quad (6)$$

Note that because the variance $\sigma^2$ in (4) is also unknown, it is incorporated into the optimization process.

The optimization process of the present disclosure is based on the fact that the Laplacian prior equation (5) can be rewritten as a hierarchical decomposition of two other distributions: a zero-mean Gaussian prior $p(\beta_{ii}|\tau_t)$ with the variance $\tau_i$ that has an exponential hyper prior $$p(\tau_i | \gamma) = \frac{\gamma}{2} \exp\left\{-\frac{\gamma}{2} \tau_i\right\} \quad (7)$$

As a result, the distribution (6) can be rewritten as $$p(y|\beta, \sigma^2) p(\beta|\gamma) = p(y|\beta, \sigma^2) p(\beta|\tau) p(\Sigma|\gamma). \quad (8)$$

If the values of new parameter $\tau = [\tau_1, \tau_2, \ldots, \tau_p]^T$, i.e., $p(\tau|\gamma) = 1$, could be observed, then the posterior distribution (8) is simplified because both $p(y|\beta, \sigma^2)$ and $p(\beta|\tau)$ in the right side of equation (8) are Gaussian distributions. The log-posterior is rewritten as $$\log\{p(y|\beta, \sigma^2) p(\beta|\tau)\} \propto -n \log \sigma^2 - \frac{\|y - \Phi\beta\|_2^2}{n} - \beta^T \Gamma(\tau) \beta \quad (9)$$

where $\Gamma(\tau) = \operatorname{diag}(\tau_1 - 1, \ldots, \tau_p - 1)$ is the diagonal matrix with the inverse variances of all $\beta_i$s. By taking the derivatives with respect to β and $\sigma^2$ respectively, the solution that maximizes equation (9) is obtained.

In reality, however, because the values of τ (and hence the matrix $\Gamma_{(\tau)}$ in (9)) are not known, equation (9) cannot be maximized directly. Instead the following expectation maximization (EM) process is used to find the solution. The EM process is an iterative technique, which computes the expectation of hidden variables τ and uses such expectation as the estimation of τ to find the optimal solution. Each iteration comprises an E-step and an M-step.

The E-step computes the conditional expectation of $\Gamma_{(\tau)}$ given y and the current estimate $\hat{\sigma}^2_{(t)}$ and $\hat{B}_t$ $$V(t) = E\left[\Gamma(\tau) | y, \hat{\sigma}^2_{(t)}, \hat{B}_{(t)}\right] = \\ \operatorname{diag}\{E[\tau_1^{-1} | y, \hat{\sigma}^2_{(t)}, \hat{B}_t], \ldots, E[\tau_p^{-1} | y, \hat{\sigma}^2_{(t)}, \hat{B}_t]\}. \quad (10)$$

Since $$E[\tau_i^{-1} | y, \hat{\sigma}^2_{(t)}, \hat{B}_t] = \frac{\int_0^\infty \frac{1}{\tau_i} \mathcal{N}(\hat{\beta}_{i,(t)} | 0, \tau_i) \frac{\gamma}{2} \exp\left(\frac{\gamma}{2} \tau_i\right) d\tau_i}{\int_0^\infty \mathcal{N}(\hat{\beta}_{i,(t)} | 0, \tau_i) \frac{\gamma}{2} \exp\left(\frac{\gamma}{2} \tau_i\right) d\tau_i} = \frac{\gamma}{|\hat{\beta}_{i,(t)}|}, \quad (11)$$

Thus $$V(t) = \gamma \operatorname{diag}\{|\hat{\beta}_{i,(t)}|^{-1}, \ldots, |\hat{\beta}_{p,(t)}|^{-1}\}. \quad (12)$$

The M-step performs the maximization of equation (9) with respect to $\sigma^2$ and β except that the matrix $\Gamma(\tau)$ is replaced with its conditional expectation V(t). According the following equations are obtained:

$$\hat{\sigma}^2_{(t+1)} = \mathrm{argmax}\left\{-n\,\log\sigma^2 - \frac{\|y - \Phi\beta\|_2^2}{\sigma^2}\right\} \quad (13)$$

$$= \frac{\|y - \Phi\hat{\beta}_{(t)}\|_2^2}{n},$$

$$\hat{\beta}_{(t+1)} = \mathrm{argmax}\left\{-\frac{\|y - \Phi\beta\|_2^2}{\sigma^2} - \beta^T V(1)\beta\right\} \quad (14)$$

$$= (\hat{\sigma}^2_{(t+i)} V(i) + \Phi^T\Phi)^{-1}\Phi^T y.$$

The EM process is easy to implement, and converges to the maximum of posterior probability of equation (6) quickly.

Due to the nature of software simulation, the initial data for constructing the model may contain errors. Such errors come from several aspects of the simulation process. For example, since some modules for implementing the hardware processor are not open to the public, simulation tools only rely on some available mechanisms to realize those components, which causes implementation imprecisions in the simulation. There also exist specification inaccuracies in simulation tools in order to improve the efficiency of simulation process. That is, most tools take certain simplifications in the simulation specification to reduce the long simulation time. Due to those errors in simulation, the application is also run on a number of hardware platforms, and collect the evaluation data $[\tilde{x}^{(i)}, \tilde{y}^{(i)}]$, i=1, . . . , m, to enhance the quality of prediction. However the number of real evaluations m is much smaller than the size of simulation data. If the generalized regression is learned in the same way as in the simulation, the model may contain large variances. Instead, the knowledge learned from both simulation and the real evaluation data is combined to improve the prediction model.

Figure 4:
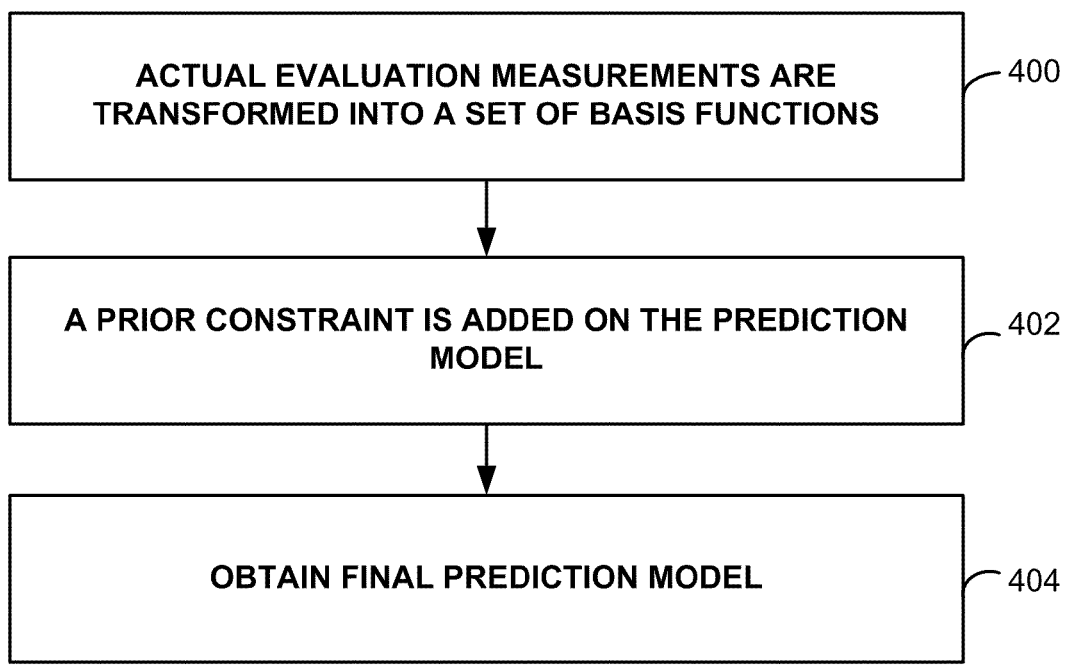
FIG. 4 is a flowchart detailing the prediction model enhancement processes represented by block 204 of the method of FIG. 2.

FIG. 4 illustrates a flowchart detailing the prediction model enhancement processes of block 204 of FIG. 2. In block 400, the actual evaluation measurements are transformed into a set of basis functions $\{\tilde{\phi}_i\}$ in the generally the same manner as describe above with respect to blocks 300 and 302 of FIG. 3, with the exception that, rather than including all the components in the regression (2), only relevant basis functions are selected into the model, i.e., those with non-zero coefficients in performance model learned from simulation. As a result, the following equation is obtained:

$$\tilde{y} = \theta_1\tilde{\phi}_1 + \theta_2\tilde{\phi}_2 + \ldots + \theta_K\tilde{\phi}_K. \quad (15)$$

Compared with the equation (2), only K basis functions, whose associated coefficients β in simulation are non-zeros, are included in the regression of equation (15).

The real evaluation data, and measurement noise is obtained by solving equation (15) by maximizing the likelihood function:

$$P(\tilde{y}\,|\,\tilde{x}, \theta, \tilde{\sigma}^2) \propto (\tilde{\sigma}^2)^{-\frac{m}{2}} \exp\left\{-\frac{1}{2\tilde{\sigma}^2}(\tilde{y} - \tilde{\phi}\theta)^T(\tilde{y} - \tilde{\phi}\theta)\right\}, \quad (16)$$

from which the following least square solution is obtained:

$$\hat{\theta} = (\tilde{\Phi}^T\tilde{\Phi})^{-1}\tilde{\Phi}^T\tilde{y}, \quad (17)$$

where $[\tilde{\Phi},\tilde{y}]$ represents the real evaluation data, and $\tilde{\sigma}^2$ is the measurement noise. Note that symbol "~" is used to differentiate the variables with those in the simulation stage.

However, since we only have limited real evaluation data, the least square solution $\hat{\theta}$ may not be accurate. Therefore, the knowledge learned from simulation is used to guide the estimation of prediction model θ, thereby improving the quality of estimation. That is, the values of prediction model θ should be close to the corresponding coefficients in β learned from simulation. Our insight here is that although the coefficients β learned from simulation are not accurate, they still can provide guidance for the possible range of prediction model θ values. Therefore, in block 402, a prior constraint is added on the prediction model θ, whose value follows a Gaussian distribution with the mean prediction model θ as the corresponding β values learned during model construction and covariance Σ:

$$P(\theta\,|\,\tilde{\sigma}^2) = (\tilde{\sigma}^2)^{-K} \exp\left\{-\frac{1}{2\tilde{\sigma}^2}(\theta - \bar{\theta})^T\Sigma^{-1}(\theta - \bar{\theta})\right\}. \quad (18)$$

Figure 5A:
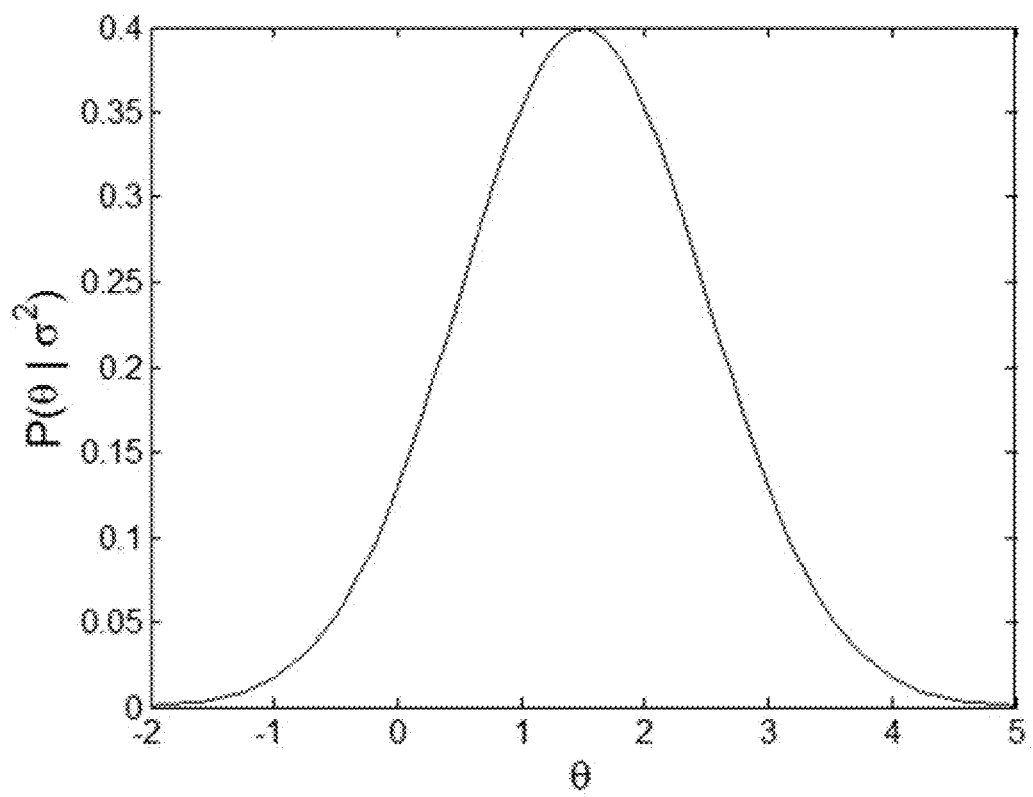
FIG. 5A is graph illustrating the prior distribution for $P(\theta|\sigma^2)$.

As shown in FIG. 5A, the distribution of prediction model θ is located around the mean value prediction model θ learned from simulation. The covariance Σ is chosen as Σ=cI, which controls the confidence of such prior information.

Figure 5B:
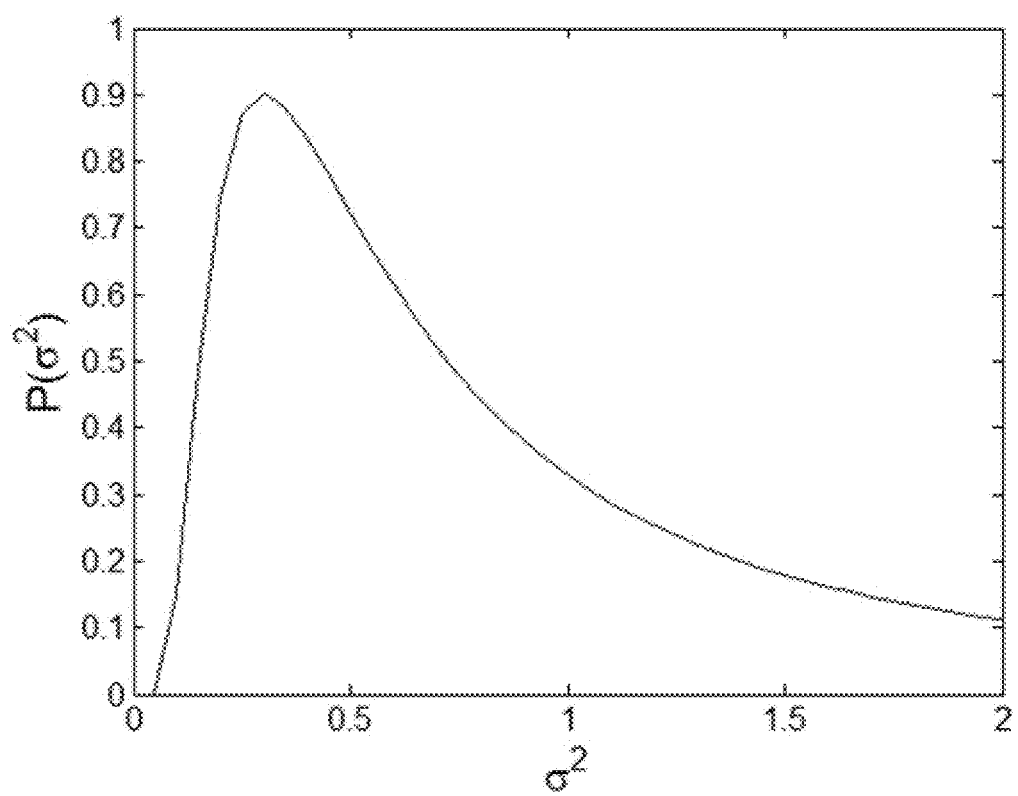
FIG. 5B is graph illustrating the prior distribution for $P(\tilde{\sigma}^2)$.

Since the variance $\tilde{\sigma}^2$ in equations (16)(18) is unknown, the inverse-gamma distribution is used to model $P(\tilde{\sigma}^2)$:

$$P(\tilde{\sigma}^2) = \frac{b^a}{\Gamma(a)}(\tilde{\sigma}^2)^{-(a+1)}\exp\left(-\frac{b}{\tilde{\sigma}^2}\right), \quad (19)$$

where a, b are two parameters to control the shape and scale of the distribution, Γ(a) is the gamma function of a. In one exemplary embodiment, a=1, b=1 can be used to plot the curve of $P\tilde{\sigma}^2$ shown in FIG. 5B.

With those specified priors (the prior knowledge learned from the simulation, as well as the prior distribution model parameters, i.e. equation (19), the final solution (prediction model) is obtained in block 404 by combining the equations (16)(18)(19) to express the posterior distribution for model parameters:

$$P(\theta,\tilde{\sigma}^2\,|\,\tilde{y},\tilde{\Phi}) \propto P(\tilde{y}\,|\,\tilde{\Phi},\theta,\tilde{\sigma}^2)P(\theta\,|\,\tilde{\sigma}^2)P(\tilde{\sigma}^2) \quad (20)$$

By integrating out $\tilde{\sigma}^2$ in $P(\theta\tilde{\sigma}^2|\tilde{y},\tilde{\Phi})$, we obtain the marginal distribution for prediction model θ as a multi-variable t-distribution, from which the maximum can be found at $$\theta^* = (\tilde{\Phi}^T\tilde{\Phi} + \Sigma^{-1})^{-1}(\tilde{\Phi}^T\tilde{\Phi}\hat{\theta} + \Sigma^{-1}\bar{\theta}). \quad (21)$$

The final prediction model θ* is the weighted average of the prior prediction model $\bar{\theta}$ and the model $\hat{\theta}$ that is obtained from the standard least square solution expressed in equation (17). The weights are provided by the conditional prior precision Σ and the data matrix $\tilde{\Phi}^T$. Since we select Σ=cI, the parameter c determines how simulation results are a tradeoff against the real evaluation results. The value of c can be tuned to balance the importance between those two parts. For instance, by choosing small c values, greater posterior weights can be placed on the simulation results in the final model.

The above Bayesian guided learning generates the final coefficients θ^* for the performance model (15), which combines the outcomes from real evaluation and simulation processes.

Figure 6:
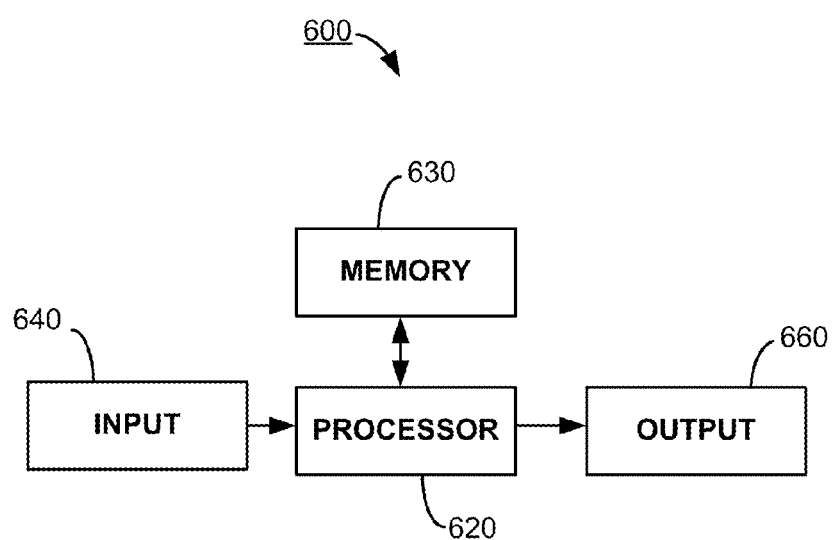
FIG. 6 is a block diagram of an exemplary embodiment of a computer system or apparatus for implementing the method for estimating application performance across heterogeneous machines.

FIG. 6 is a block diagram of an exemplary embodiment of a computer system or apparatus 600 for implementing the methods described herein. The computer system 600 includes at least one CPU 620, at least one memory 630 for storing one or more programs which are executable by the processor(s) 620 for implementing the method described herein, one or more inputs 640 for receiving input data and an output 660 for outputting data.

While exemplary drawings and specific embodiments of the present disclosure have been described and illustrated, it is to be understood that that the scope of the invention as set forth in the claims is not to be limited to the particular embodiments discussed. Thus, the embodiments shall be regarded as illustrative rather than restrictive, and it should be understood that variations may be made in those embodiments by persons skilled in the art without departing from the scope of the invention as set forth in the claims that follow and their structural and functional equivalents.

What is claimed is:

1. A method for predicting performance of an application on a server of a predetermined hardware configuration, the method comprising:
    simulating, in a computer process, the performance of the application under a plurality of different simulated server hardware configurations, each of the simulated performances of the application measured in average CPU cycles per instruction;
    building, in a computer process, a predictive model for predicting the performance of the application on a server with any hardware configuration based on the results of the simulations;
    obtaining actual performances of the application on a plurality of actual servers, each of the servers having a different hardware configuration, each of the actual performances of the application measured in average CPU cycles per instruction; and
    in a computer process, Bayesian reinterpreting the predictive model built from the results of the simulations using the actual performances of the application on the plurality of actual servers to obtain a final predictive model $\theta^*$ of the performance of the application having an accuracy greater than the predictive model built from the results of the simulations, the final predictive model $\theta^*$ comprising a weighted average of prior predictive model $\bar{\theta}$ and predictive model $\hat{\theta}$ obtained from a least square solution, the final predictive model $\theta^*$ being equal to $(\tilde{\phi}^T\tilde{\phi}+\Sigma^{-1})^{-1}(\tilde{\phi}^T\tilde{\phi}\hat{\theta}+\Sigma^{-1}\bar{\theta})$, wherein $\tilde{\phi}_T\tilde{\phi}$ and $\Sigma$ are weights comprising a data matrix and a covariance, respectively.

2. The method of claim 1, wherein the building of the predictive model comprises modeling nonlinear dependencies between the simulated performance of the application and the simulated hardware configurations with a generalized linear regression model with L1 penalty.

3. The method of claim 2, wherein the modeling of nonlinear dependencies comprises defining a set of basis functions to transform original variables so that their nonlinear relationships can be included in the predictive model.

4. The method of claim 2, wherein the modeling of nonlinear dependencies comprises applying the L1 norm penalty on coefficients of the linear regression model to achieve sparseness of the predictive model's representation.

5. The method of claim 2, wherein the Bayesian reinterpreting of the predictive model comprises searching for an optimal solution for the linear regression model with L1 penalty.

6. The method of claim 1, wherein the Bayesian reinterpreting of the predictive model built from the results of the simulations comprises relearning parameters of the linear regression model using the performance of the application on the plurality of actual machines.

7. The method of claim 1, wherein the Bayesian reinterpreting of the predictive model built from the results of the simulations comprises defining a prior distribution which embeds information learned from the simulations to restrict values of the coefficients of the linear regression model.

8. The method of claim 1, wherein the Bayesian reinterpreting of the predictive model built from the results of the simulations comprises maximizing posterior probability distribution of model parameters so that the final predictive model comprises contributions from the simulated and actual hardware configurations.

9. An apparatus for predicting performance of an application on a server of a predetermined hardware configuration, the apparatus comprising:
    a processor executing instructions for:
        simulating the performance of the application under a plurality of different simulated server hardware configurations, each of the simulated performances measured in average CPU cycles per instruction;
        building a predictive model for predicting the performance of the application on a server with any hardware configuration based on the results of the simulations; and
        Bayesian reinterpreting the predictive model built from the results of the simulations using actual performances of the application on a plurality of actual servers each having a different hardware configuration, each of the actual performances of the application measured in average CPU cycles per instruction, to obtain a final predictive model $\theta^*$ of the performance of the application having an accuracy greater than the predictive model built from the results of the simulations, the final predictive model $\theta^*$ comprising a weighted average of prior predictive model $\bar{\theta}$ and predictive model $\hat{\theta}$ obtained from a least square solution, the final predictive model $\theta^*$ being equal to $(\tilde{\phi}^T\tilde{\phi}+\Sigma^{-1})^{-1}(\tilde{\phi}^T\tilde{\phi}\hat{\theta}+\Sigma^{-1}\bar{\theta})$, wherein $\tilde{\phi}_T\tilde{\phi}$ and $\Sigma$ are weights comprising a data matrix and a covariance, respectively.

10. The apparatus of claim 9, wherein the instructions for building of the predictive model comprises instructions for modeling nonlinear dependencies between the simulated performance of the application and the simulated hardware configurations with a generalized linear regression model with L1 penalty.

11. The apparatus of claim 10, wherein the instructions for modeling of nonlinear dependencies comprises instructions for defining a set of basis functions to transform original variables so that their nonlinear relationships can be included in the predictive model.

12. The apparatus of claim 10, wherein the instructions for modeling of nonlinear dependencies comprises instructions for applying the L1 norm penalty on coefficients of the linear regression model to achieve sparseness of the predictive model's representation.

13. The apparatus of claim 10, wherein the instructions for Bayesian reinterpreting of the predictive model comprises instructions for searching for an optimal solution for the linear regression model with L1 penalty.

14. The apparatus of claim 10, wherein the instructions for Bayesian reinterpreting of the predictive model built from the results of the simulations comprises instructions for relearning parameters of the linear regression model using the performance of the application on the plurality of actual machines.

15. The apparatus of claim 9, wherein the instructions for Bayesian reinterpreting of the predictive model built from the results of the simulations comprises instructions for defining a prior distribution which embeds information learned from the simulations to restrict values of the coefficients of the linear regression model.

16. The apparatus of claim 9, wherein the instructions for Bayesian reinterpreting of the predictive model built from the results of the simulations comprises instructions for maximizing posterior probability distribution of model parameters so that the final predictive model comprises contributions from the simulated and actual hardware configurations.

\* \* \* \* \*